United States Patent [19]
Miyahara et al.

[11] Patent Number: 4,971,508
[45] Date of Patent: Nov. 20, 1990

[54] STORAGE AND CONVEYANCE OF HEAVY ARTICLES

[75] Inventors: Shoji Miyahara, Tokorozawa; Hiroshi Yanagase, Tokyo; Fusao Sonehara, Hanno, all of Japan

[73] Assignee: Tsubakimoto Chain Co., Japan

[21] Appl. No.: 484,438

[22] Filed: Feb. 20, 1990

Related U.S. Application Data

[63] Continuation of Ser. No. 212,965, Jun. 29, 1988, abandoned.

[51] Int. Cl.⁵ .............................................. B65G 65/02
[52] U.S. Cl. ...................................... 414/282; 104/137; 414/284; 414/341; 414/911
[58] Field of Search ............... 414/277, 279, 281, 282, 414/284, 341, 343, 345, 347, 495, 908, 910, 911; 105/117; 104/137

[56] References Cited

U.S. PATENT DOCUMENTS

| | | | |
|---|---|---|---|
| 3,655,074 | 4/1972 | Pipes | 414/282 |
| 3,746,189 | 7/1973 | Burch et al. | 414/284 X |
| 3,800,963 | 4/1974 | Holland | 414/279 |
| 4,265,583 | 5/1981 | Baird et al. | 414/284 |
| 4,268,207 | 5/1981 | Pipes | 414/277 |
| 4,273,494 | 6/1981 | Swain et al. | 414/284 X |
| 4,286,911 | 9/1981 | Benjamin | 414/284 X |
| 4,459,078 | 7/1984 | Chiantella et al. | 414/284 X |

FOREIGN PATENT DOCUMENTS

| | | | |
|---|---|---|---|
| 31470 | 3/1977 | Japan | 414/279 |
| 61-34506 | 3/1986 | Japan | |
| 62-144826 | 9/1987 | Japan | |
| 302297 | 4/1971 | U.S.S.R. | 414/279 |

*Primary Examiner*—David A. Bucci
*Attorney, Agent, or Firm*—Howson & Howson

[57] ABSTRACT

In a storage facility for heavy coils or the like, coils are transported to and from stationary rests by a first carriage which include a hydraulic lift. The first carriage is carried by a second carriage which moves perpendicularly to the path of the first carriage and which has its own heavy article-supporting rest. Transfer of heavy articles from rest to rest takes place by operation of the hydraulic lift in conjunction with lateral movement of the first carriage. The second carriage is self-propelled, and also carries a hydraulic pump unit for powering the lift through a flexible coupling which allows limited movement of the first carriage away from the second carriage. A third carriage, which is self-propelled and movable perpendicularly to the path of the second carriage, receives the second carriage to carry the second carriage, with a first carriage on it, to and away from the storage facility. The second and third carriages are movable independently of each other.

1 Claim, 7 Drawing Sheets

STORAGE AND CONVEYANCE OF HEAVY ARTICLES

CROSS REFERENCE TO RELATED APPLICATION

This is a continuation of our copending application, Ser. No. 212,965, filed June 29, 1988 now abandoned.

BRIEF SUMMARY OF THE INVENTION

This invention relates to the storage and conveyance of heavy articles such as metal coils. The invention has utility in iron works and in other facilities where heavy articles must be moved about.

Laid-open Japanese Utility Model Application No. 144826/1987 describes a storage/conveyance system for coils in which each coil has a non-powered carriage associated with it so that the carriages are stored along with the coils. This apparatus has the drawback that, if the number of the carriages approaches 2000, the manufacturing costs of the system become prohibitive.

In Japanese Laid-open Utility Model application No. 34506/1986, a system is disclosed wherein a second carriage, which can be carried by a first carriage, is adapted to run in a direction perpendicular to the direction of the first carriage. The second carriage is not self-propelled. Therefore, it is necessary to install a separate drive at every loading/unloading position This renders the whole system very complicated.

The principal object of the present invention is to provide a storage and conveyance system for heavy articles which overcomes the above-mentioned problems of the prior art.

The present invention is firstly a storage/conveyance system for heavy articles comprising a first carriage having a lifting means adapted to travel with a heavy article thereon; a second self-propelled carriage adapted to travel in a perpendicular direction relative to the first carriage with the first carriage thereon; and a self-propelled third carriage adapted to travel in a perpendicular direction relative to the second carriage with the first and second carriages thereon.

The present invention is secondly a system comprising a first carriage having a lifting means and a hydraulic drive means being adapted to run with a heavy article thereon; and a second self-propelled carriage adapted to run in a perpendicular direction relative to the first carriage with the first carriage thereon.

The present invention is thirdly a system according to the second embodiment wherein the second carriage is of the low-floor type.

In the case of the first embodiment, a plurality of parallel running paths for the second carriages are provided in a storage site for heavy articles such that their respective ends meet transverse running paths of the third carriages. Rests for supporting heavy articles such as coils of metal, may be provided along both sides of the running paths of the second carriages. A second carriage can be transferred from a third carriage to any selected one of its parallel running paths. A first carriage can then move sidewardly from the second carriage for deposit and retrieval of articles. Deposit and retrieval are effected by a combination of sideward movement of the first carriage and lifting and lowering movement of the lifting means of the first carriage By combining the movement of the second carriages and the transverse movement of the third carriages carrying the second carriages, heavy articles may be transported into and out of the storage site selectively with high efficiency.

In the case of the second embodiment, each of the second carriages carrying a first carriage may run independently of the transversely running third carriages. Only when the necessity arises, the second carriage is loaded onto the third carriage, and transferred to a desired different path.

DETAILED DESCRIPTION EMBODIMENTS

Figure 1:
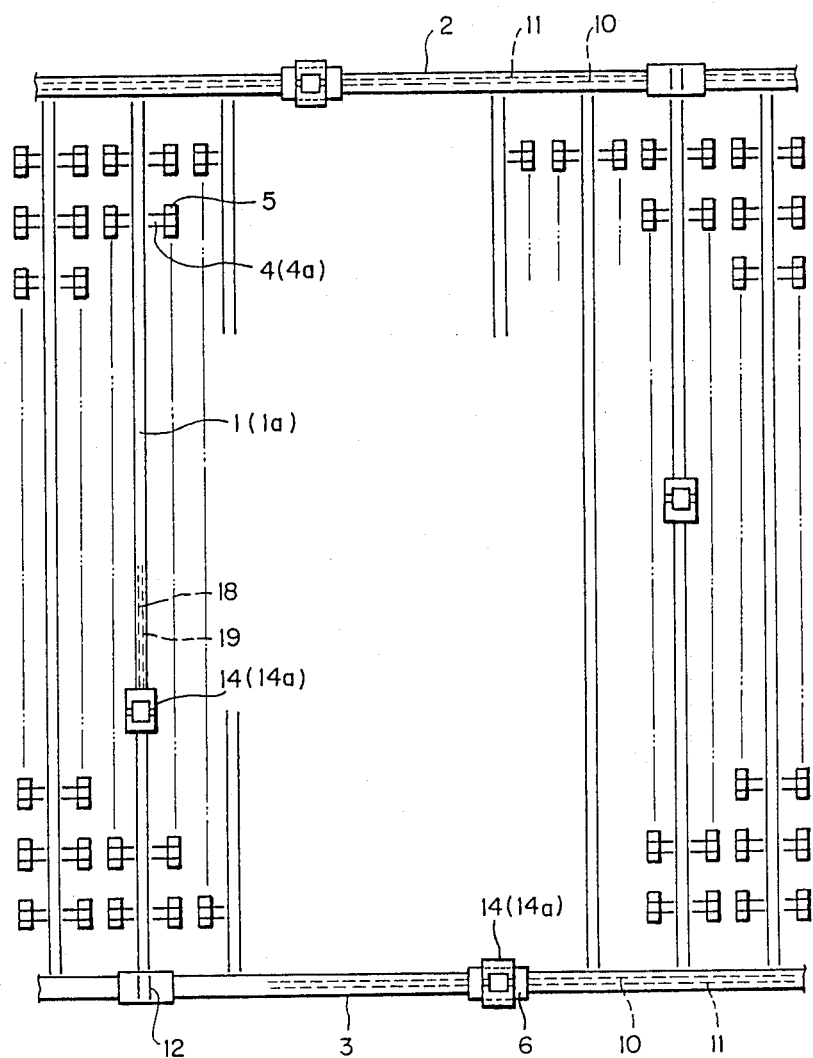
FIG. 1 is a schematic diagram of a lay-out of a storage facility according to the invention.

FIG. 1 illustrates a lay-out of a storage area for strip coils according to the present invention. At opposite ends of parallel, spaced-apart longitudinal rails 1, transverse rails 2, 3 are provided. Short rails 4 are also provided at both sides of the longitudinal rails 1 in directions perpendicular thereto. A pair of coil rests 5 are mounted with each short rail 4 therebetween.

Figure 2:
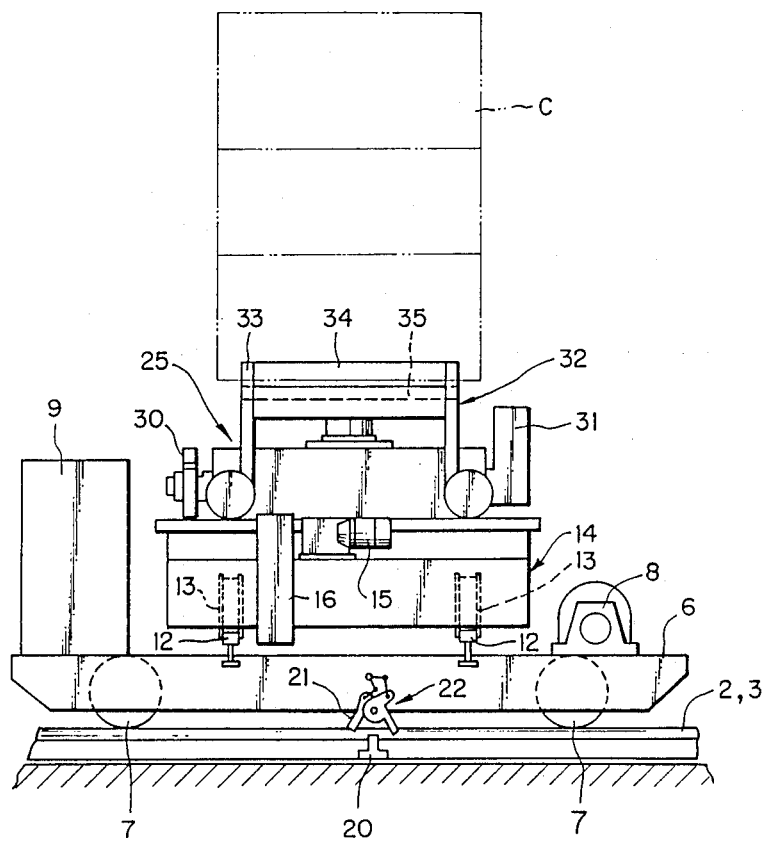
FIG. 2 is a elevation of an embodiment of this invention.
Figure 3:
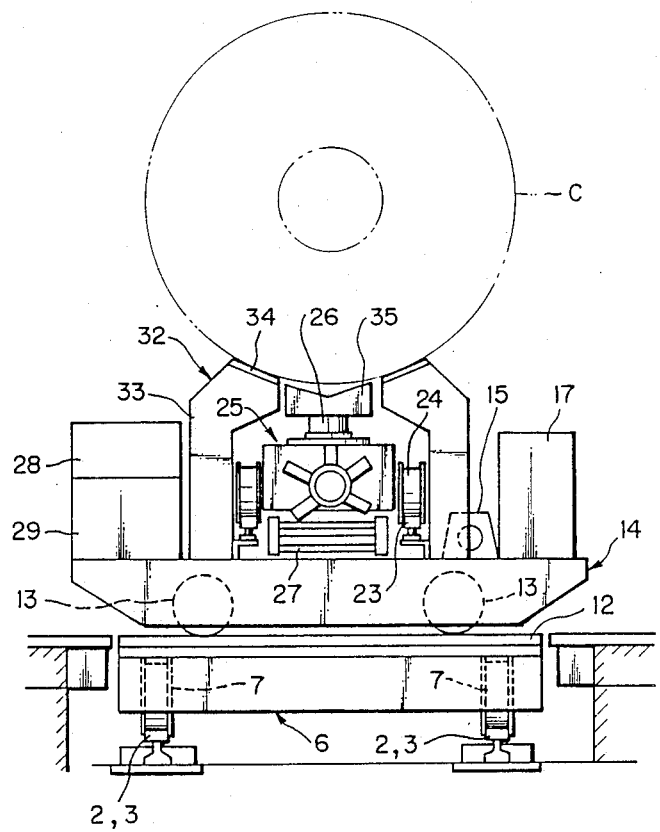
FIG. 3 is a side view thereof.

Referring to FIGS. 2 and 3, a third carriage 6 includes wheels 7 to run on rails 2, 3, a driving motor 8 and controlling means 9. The necessary power and control signals are received by means of a known collector through feed wires 10 and signal lines 11, respectively arranged along rails 2, 3 as shown in FIG. 1.

Short rails 12 are provided on third carriage 6. These short rails are adapted to become aligned with rails 1. A second carriage 14, having wheels 13 for engaging rails 12, is carried on rails 12 and can be transferred to rails 1 when rails 12 are aligned with rails 1. Carriage 14 has a driving motor 15, gear train 16 and controlling means 17. Power and control signals are received by means of known collecting means through feeding rails 18 (FIG. 1), and signal lines arranged along the rails 1 and 12. To secure alignment of rails 12 and 1, a locking device 22 is provided This locking device includes an electrically-operated clamp 21 provided on the third carriage The clamp grips a protrusion 20, which is one of many protrusions provided along the sides of the rails 2 and 3. When the clamp grips the protrusion, carriage 6 is locked in a position such that its rails 12 are aligned with stationary rails 1. Instead of a motor 15, a gear train 16 and an electrically-operated clamp 21, a hydraulic motor and a hydraulic clamp may be used.

As shown in FIG. 3, short rails 23 are provided on second carriage 14. These short rails are adapted to become aligned with stationary rails 4. A first carriage 25, having wheels 24 for engaging rails 23, is carried on rails 23 and can be transferred to rails 4 when rails 23 are aligned with rails 4. First carriage 25 includes a hydraulic cylinder 26 for lifting heavy articles and a hydraulic motor (not shown). A flexible supporting sheath 27 accommodating hoses and the signal wires connects the first and second carriages and allows the first carriage to move off the second carriage and to travel on tracks 4 in either direction through a short distance. A pump unit 28 and a tank unit 29 are provided on second carriage 14 (FIG. 3). An electrically operated control valve 30 and a valve switch-over means 31 are mounted on the first carriage 25 (FIG. 2).

A pair of coil supports 32 are fixed on second carriage 14 in close proximity to first carriage 25. Each support 32 has a pair of parallel posts with a tilting plate 34 on which coil C may rest. The height of the plate 34 is the same as that of the rest 5. A coil lifter 35 which is fixed to the ram of a hydraulic cylinder 26 is adapted to move up and down between the pair of supports 32. Coil C may be lifted by lifter 35 from supports 32 or received by the supports from lifter 35.

A second carriage 14 can run normally while carrying coil C on top of the supports 32 in a stable manner. When the second carriage 14 stops at a position where the rails 4 and 23 are aligned with each other, a hydraulic locking means is operated to lock the rails temporarily in aligned relationship. The locking means is provided on the second carriage 14 and is similar to the above-mentioned locking device 22 on carriage 6. The hydraulic cylinder 26 extends and the coil lifter 35 supports coil C. Thereafter, the second carriage 25 moves toward the position where a coil rest 5 is situated. A similar locking means is provided to secure the first carriage 25 temporarily in fixed relationship with the coil rest 5. After operating the locking means, the hydraulic cylinder 26 contracts, thereby transferring coil C to the rest 5. Thereafter, the first carriage 25 returns to the second carriage 14, and the second carriage 14, in turn, goes back to the third carriage 6 Thus, coils are conveyed into the storage site.

To convey coils out of the storage site, the above-described procedure is reversed.

Figure 4:
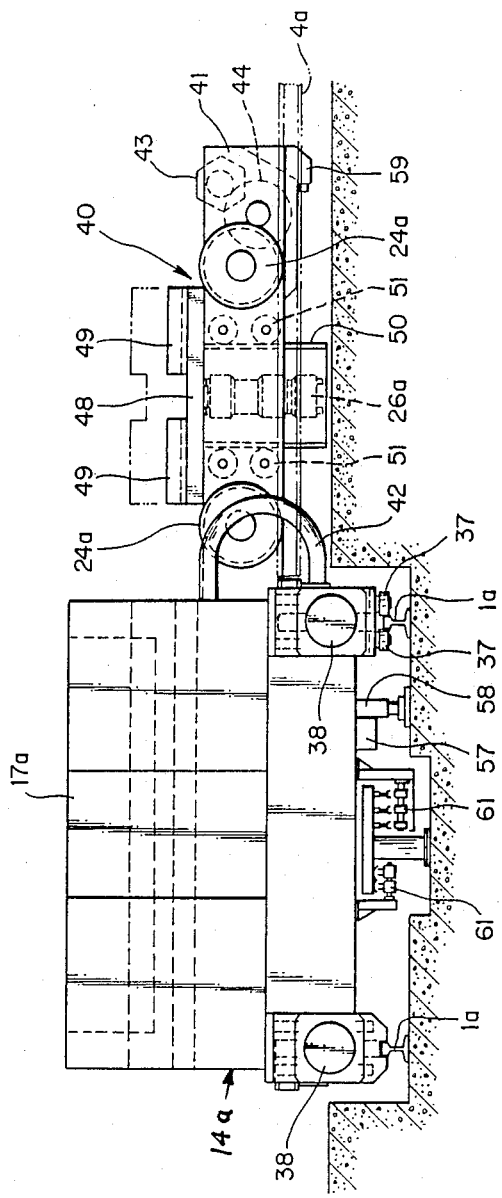
FIG. 4 is an elevation where a first carriage has moved sidewardly according to the second embodiment of this invention.
Figure 5:
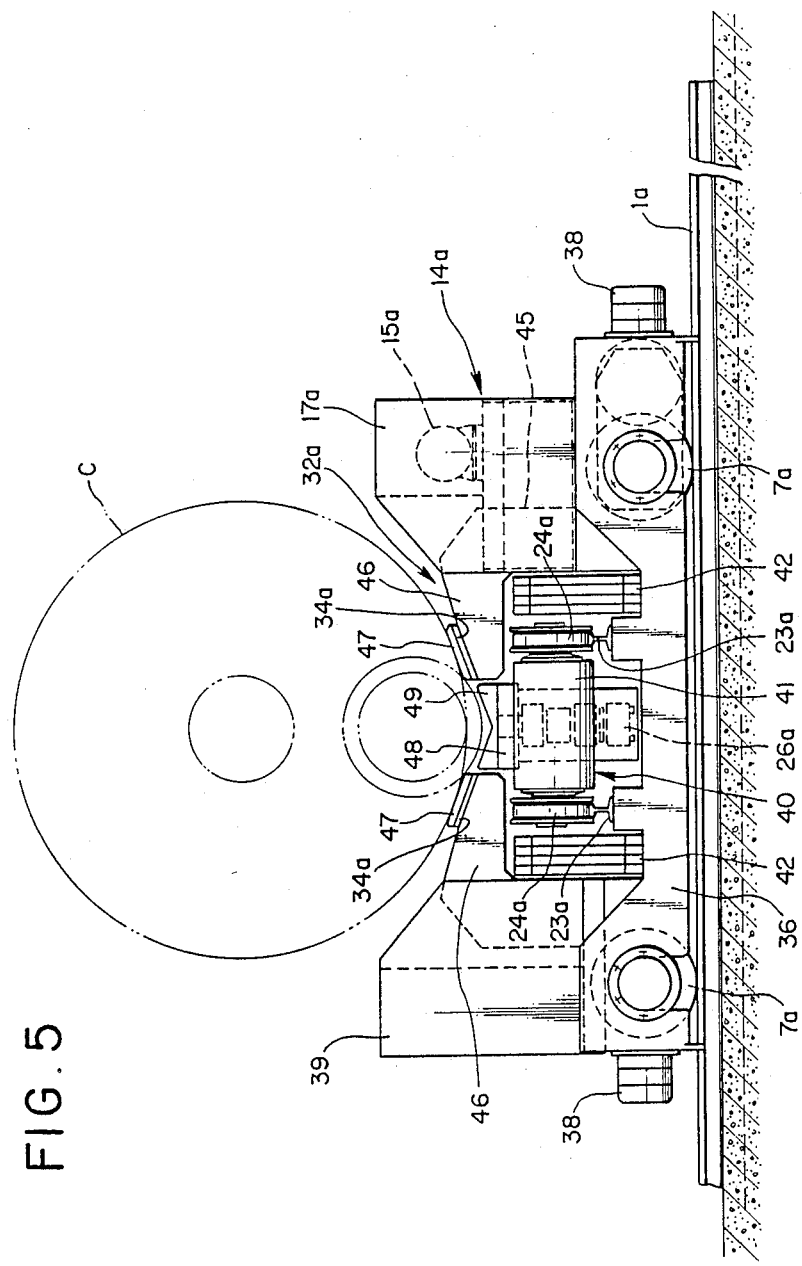
FIG. 5 is a side view thereof.
Figure 6:
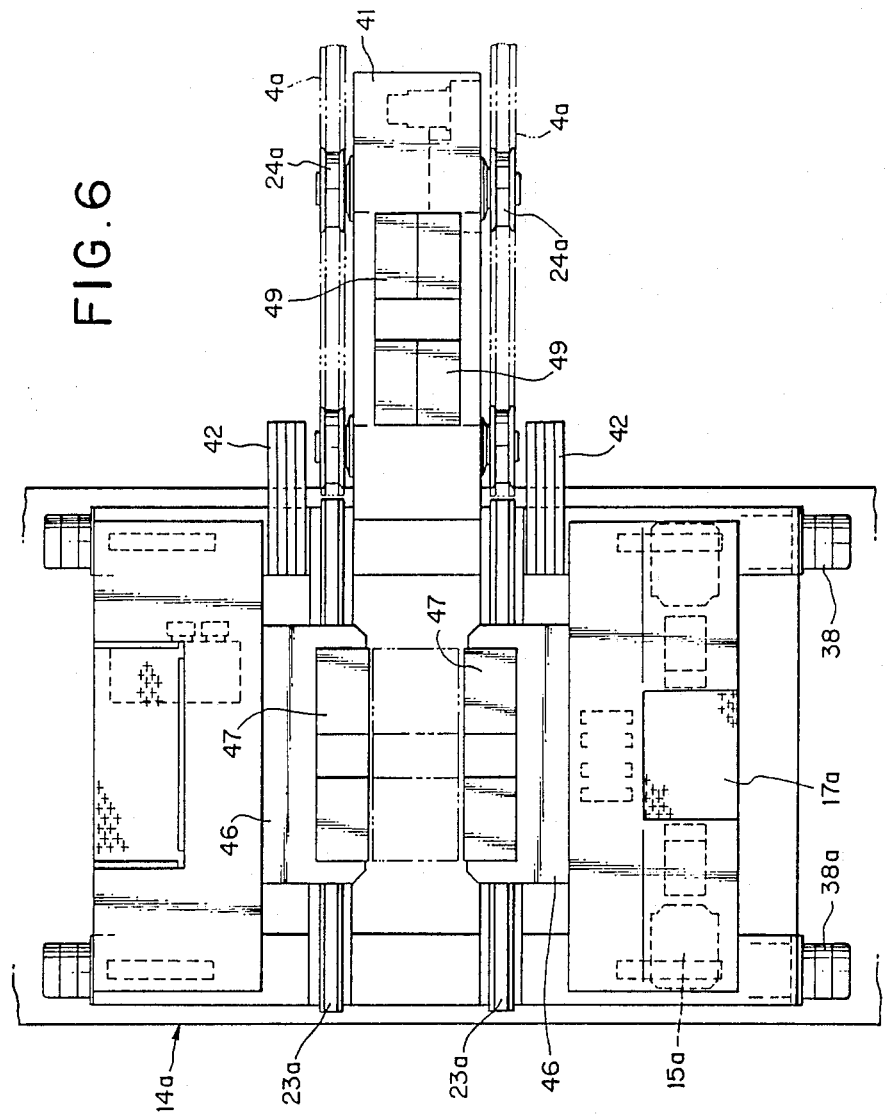
FIG. 6 is a plan view thereof.

FIGS. 4–6 show the second embodiment of the invention, in elevation, side and plan views, respectively. Similar component parts are designated by adding suffix "a" to the references heretofore used.

A third carriage 6, as in FIGS. 2, 3, which travels on transverse rail 2, includes short rails 12 for carrying a second carriage 14a. Carriage 14a, as shown in FIG. 4, runs on longitudinal rails 1a. Carriages 6 and 14a are capable of running independently of each other. Only when it is necessary, the third carriage 6 is used to transfer a second carriage 14a to another rail 1a.

As shown in FIG. 5, second carriage 14a has a low-floor type frame 36 which is formed such that the portion of the floor between the two wheels 7a is made closer to the rails 1a, on which the wheels 7a are adapted to run. The frame 36 is equipped with guide rollers 37 (FIG. 4) to engage sides of a rail 1a to restrain carriage 14a against sideward movement. Front and rear hydraulic dampers 38, a control panel 17a, a driving motor 15a, and a hydraulic unit 39 including a hydraulic pump, tank, etc., are included on frame 36. As the low-floor type frame is used, the second carriage 14a can travel in a shallow pit, as shown in FIG. 4.

A pair of short rails 23a is provided in the middle of frame 36 such that a first carriage 40 having wheels 24a may be carried thereon The length of first carriage 40 is almost the same as the width of second carriage 14a The first carriage 40 has a frame 41 which supports wheels 24a. A hydraulic drive motor 43 is provided on frame 41, and oil is supplied thereto through hoses accommodated in a flexible sheath 42 from the hydraulic unit 39. The first carriage 40 may run in both right and left directions through a distance substantially equal to the full width of the second carriage 14a by means of wheels 24a driven by hydraulic motor 43 via a reduction gear train 44.

A pair of coil supports 32a is secured at the center of frame 36 of the second carriage 14a. Each support 32a comprises a vertical post 45 and a horizontal portion 46. The height and the spacing of the pair are such that the first carriage 40 may run transversely on the second carriage 14a. The distance between the tips of the horizontal portions 46 is chosen so that the smallest diameter coil C to be transported may be carried thereon as shown in FIG. 5. Tilting coil-receiving plates 34a are fixed at the upper inner end of each of the horizontal portions 46. On top of the coil-receiving plates 34a, plastic plates 7 are secured to prevent possible damage to the surface of the coils during conveyance or transfer The tilting angle of the plates is adapted to the largest diameter coil to be transported as shown in FIG. 5.

A hydraulic cylinder 26a is vertically mounted at the center of the frame 41 of the first carriage, and serves as a lifting means for coils. A coil supporting plate 48 is fixed on top of the hydraulic cylinder, and a coil receiver 49, made of plastics material is fixed on top thereof. The width of the coil receiver 49 is such that it can pass between the tips of the horizontal portions 46 of the support, and the length of the coil receiver is such that it can stably lift coils. The upper surface of the coil receiver is recessed downwardly as shown in FIG. 5. As seen in FIG. 4, a rectangular cylinder 50 is fixed to the lower surface of the coil supporting plate 48. The rectangular cylinder 50 surrounds hydraulic cylinder 26a, and the vertical surfaces of the rectangular cylinder 50 are guided by rollers 51 supported on the frame 41. This ensures stable lifting of coils supported on the receiver 49. While the second carriage 14a is running, the first carriage 40 is fixed at the center of the second carriage, and coil C is supported on plates 47. The coil receiver 49 is lowered so that it does not abut coil C.

Figure 7:
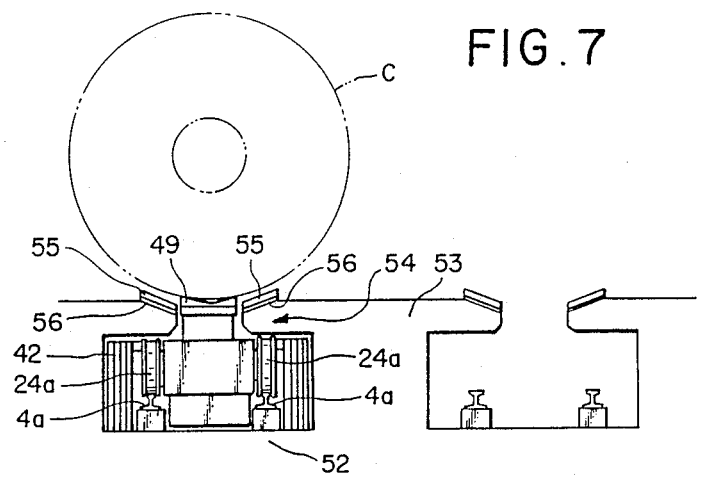
FIG. 7 is a side view of a rest.
Figure 8:
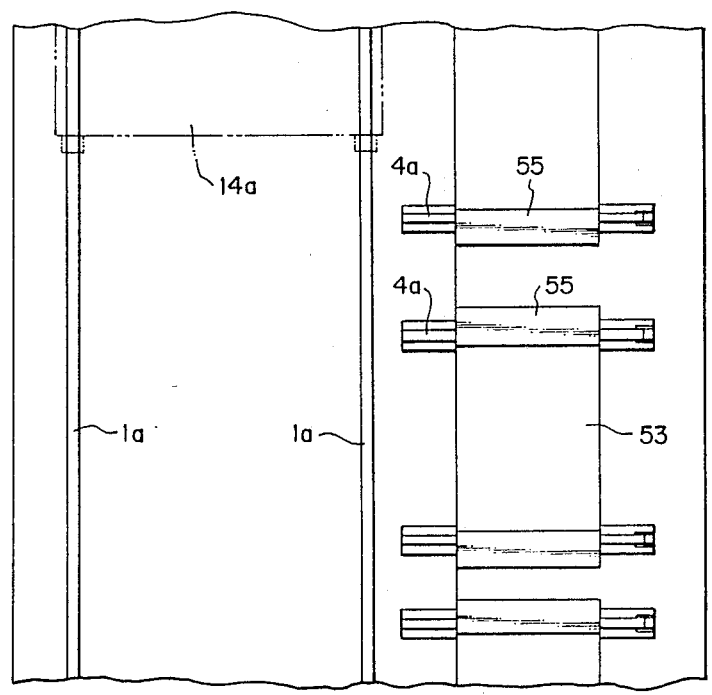
FIG. 8 is a plan view thereof.

In the coil storage equipment as shown in FIG. 1, a plurality of short rails 4a are provided alongside and perpendicular to rails 1a so that a set of short rails 23a on the second carriage may be aligned with a stationary set of short rails 4a. As shown in FIGS. 7 and 8, a pair of coil rests 54 are formed at the upper end of a support 53 which rises from the base 52. The coil rests 54 are situated over short rails 4a so that wheels 24a can pass into the space defined beneath the rests. Plastic plates 55 and receiver plates 56 are provided on the coil rests 54 and positioned so that plastic plates 55 may align with counterpart plastic plates 47 on supports 32a of the second carriage 14a.

To transfer coil C from a first carriage 40 to a coil rest 54, a second carriage 14a is first stopped at a position where its short rails 23a are aligned with short rails 4a. A clamp plate 57 (FIG. 4), provided at the lower side of frame 36 of the second carriage 14a, is gripped by a clamp 58 provided on the floor, so that the second carriage 14a is locked at the desired position Then, hydraulic cylinder 26a is extended to support coil C on the coil receiver 49. Thereafter, the first carriage 40 is advanced by hydraulic cylinder 43 sidewardly toward a coil rest 54 through the distance almost equal to the length of the first carriage 40. A hydraulic damper 59, provided at the front end of the first carriage 40, is used in cooperation with a stop (not shown) to position the carriage accurately in a desired stop position.

Next, hydraulic cylinder 26a is contracted to transfer coil C to coil rest 54. Then, first carriage 40 is returned to its original position on the second carriage 14a.

The above procedure may be reversed to transfer coil C from the rest 54 to the first carriage 40.

Thus, in a coil storage facility in which a plurality of rails 1a and 2, 3 are arranged in perpendicular relationship with each other, second carriage 14a may run independent of the third carriage 6 except when the former is required to be conveyed transversely by means of the latter.

The necessary power and the control signals may be received from a known collecting means 61 (FIG. 4) provided on frame 36, and the control means 17a ensures the above-described automatic operation of the conveyance and its movement into and out of the storage equipment in response to externally supplied control signals.

The invention has the following among its more important advantages:

(1) Heavy articles, such as metal coils, may be transferred to and stored on rests of relatively simple structure. Consequently, significant cost savings are realized, particularly when the number of the stored articles is substantial.

(2) Transportation of articles into and out of the storage equipment may be simultaneously effected by using a plurality of second carriages combined with transversely moving third carriages.

(3) Hydraulic and control means for the conveyance of heavy articles may be built in the second carriages, thus making it possible to effect conveyance automatically by means of externally supplied control signals.

(4) The height of equipment is lower than that of conventional equipment using cranes. Consequently the cost of construction is lower.

(5) The use of linearly extending rails permits high storage density, thus reducing floor area requirements.

(6) Conveyance of heavy articles may be efficiently and independently conducted by means of second carriages even if conventional equipment, such as cranes and coil cars are utilized at the entrance and/or exit of the storage facility.

(7) Low-floor type second carriages make it possible to use shallow pits for their rails.

We claim:

1. A storage and conveying system for metal coils comprising:
a stationary base;
a plurality of supports extending upwardly from said base;
a plurality of stationary rests, each rest comprising a first arm extending laterally from one support and a second arm extending laterally from an adjacent support, the first and second arms extending toward each other but spaced from each other and being spaced above said base in overhanging relationship therewith, and each arm having plate means at its end remote from the support from which it extends, the plate means on the first and second arms providing oblique surfaces cooperating with each other to receive and support a metal coil;
first multiple-track rail means comprising a track associated with each rest for laterally transporting a first carriage to and from a position adjacent to the rest, each track of the first multiple-track rail means comprising a first rail extending underneath the first arm of one of said stationary rests and a second rail, parallel to said first rail, and extending underneath the second arm of said one of said stationary rests;
a plurality of first carriages movable on the tracks associated with the stationary rests;
second multiple-track rail means extending perpendicular to the tracks of the first rail means and establishing an array of parallel tracks each extending perpendicular to the tracks of the first rail means, and each track of the first rail means approaching a track of the second rail means perpendicularly; and
a plurality of second carriages movable on the tracks of the second rail means, each second carriage having a short track of its own carried thereby, said short track of each second carriage comprising two parallel rails and being selectably alignable with tracks of the first multiple-track rail means whereby a first carriage can move from the short track of any of the second carriages to a selected track of the first multiple-track rail means and from said selected track to the short track of any of said second carriages;
each of said first carriages also carrying lift means for raising and lowering heavy articles from and to the stationary rests, whereby articles may be transferred from and to the rests by raising and lowering movements of the lift means in conjunction with lateral movement of the first carriage; and
each of said second carriages carrying propulsion means for moving the second carriage along the tracks of the second rail means, whereby the second carriages are self-propelled;
all of the stationary rests of the storage and conveying system being at substantially the same level; and
said storage and conveying system including third rail means comprising at least one track approached perpendicularly by the tracks of the second rail means, and a third carriage movable on the track of said third rail means, said third carriage having a short track of its own carried thereby and selectably alignable with tracks of the second multiple-track rail means whereby the second carriages can move from said short track of the third carriage to a selected track of the second multiple-track rail means and from said selected track of the second multiple-track rail means to said short track of the third carriage, wherein the third carriage carries propulsion means for moving the third carriage along the track of the third rail means whereby the third carriage is self-propelled, and wherein the third carriage and second carriages are movable independently of one another;
whereby simultaneous transportation of multiple articles to and from the stationary rests can be effected;
in which the spacing between the adjacent ends of the first and second arms of each stationary rest is less than the distance between the rails of the track of the first multiple-track rail means associated with the same stationary rest.

* * * * *